W. A. RICHARDSON.
CLAMP.
APPLICATION FILED DEC. 2, 1916.
1,243,105.
Patented Oct. 16, 1917.
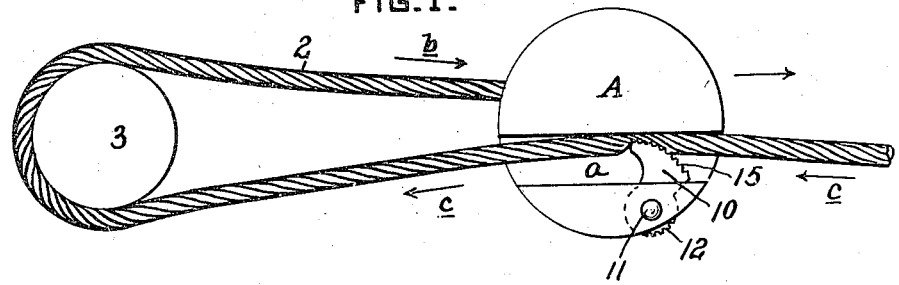
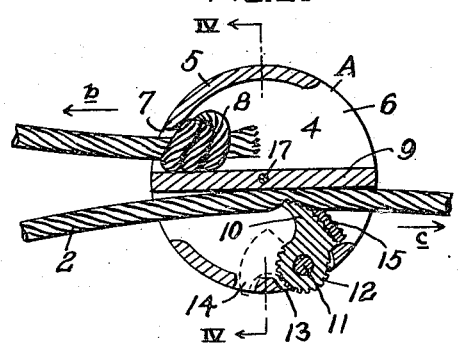
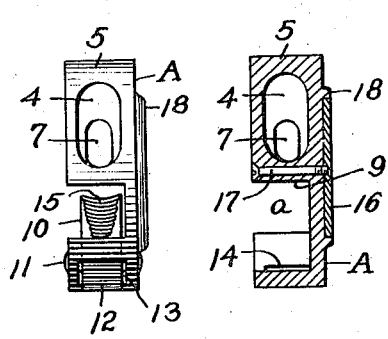
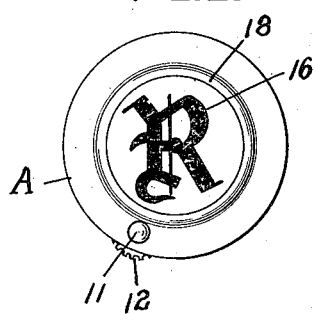
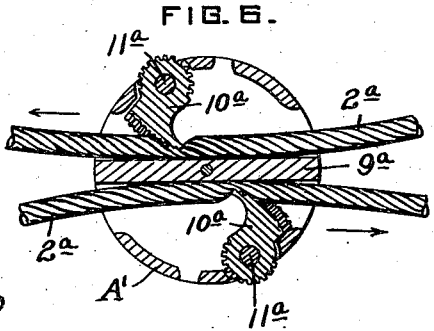
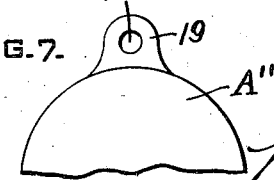
WITNESSES
J. Herbert Bradley.
Ashley H. Brochedo.
INVENTOR
William A. Richardson
by C. M. Clarke
his Attorney

UNITED STATES PATENT OFFICE.

WILLIAM A. RICHARDSON, OF EDWARDSVILLE, ILLINOIS, ASSIGNOR TO RICHWIN MANUFACTURING COMPANY, OF CHICAGO, ILLINOIS, A CORPORATION OF ILLINOIS.

CLAMP.

1,243,105.  Specification of Letters Patent.  Patented Oct. 16, 1917.

Application filed December 2, 1916. Serial No. 134,669.

*To all whom it may concern:*

Be it known that I, WILLIAM A. RICHARDSON, a citizen of the United States, residing at Edwardsville, in the county of Madison and State of Illinois, have invented certain new and useful Improvements in Clamps, of which the following is a specification.

My invention consists of an improvement in holding, clamping or locking devices for ropes, cords, etc., and is particularly designed to provide a device adapted to be used with a flexible tying element having one or both ends free.

It comprises a unitary holding member of suitable shape, as in disk form, having suitable recesses for receiving the tying element, as a cord, with a bearing surface or surfaces, and one or more pivoted locking dogs, operable in the manner hereinafter described.

In the drawings illustrating preferred constructions embodying the invention:

Figure 1 is a face view of a clamp having a cord attached by one end and a single locking dog.

Fig. 2 is a cross-sectional view of the construction generally shown in Fig. 1.

Fig. 3 is an edge view of the device.

Fig. 4 is a vertical sectional view indicated by the line IV, IV, of Fig. 2.

Fig. 5 is a face view of the obverse side, opposite to that shown in Fig. 1, and illustrating the use of an identifying initial letter.

Fig. 6 is a cross-sectional view, similar to that shown in Fig. 2, and providing for a pair of oppositely acting locking dogs.

Fig. 7 is a detail view, showing the device provided with an attaching lug or flange.

The clamping device is adapted or intended for use in connection with a flexible cord or similar tying or holding element 2, and is designed to be used either with one end of the cord fixedly attached to the locking or clamping element, which is provided with means for holding the other or freely running portion of the cord so as to hold it against loosening, as in Figs. 1 to 4 inclusive, or with both ends free, as in Fig. 6.

The clamp is designed to hold the cord 2 when used in various ways, as for instance: around bundles, when used as a holder for books or other assembled articles, for use with tent ropes in connection with the usual pins, with guide ropes, with the "painter" of a boat, with the cords of a tennis net, or in various other ways which will suggest themselves to the user.

In such case, the rope or cord 2 is passed around the article to be held, or the abutment to be connected with, as for instance: a post or pin 3, and the other or free end of the cord is inserted in a groove *a* in the holding device and therein engaged by the locking dog which operates to hold it tightly against a bearing surface in proportion to the tension or strain exerted.

When used in the manner indicated in Fig. 1, and assuming that the cord is passed around a post 3 and the other or free end of the cord to be connected with, for instance: a tennis net, the locking device indicated generally by the letter A, may be drawn toward the net, drawing with it the attached cord in the direction of the arrow *b*, at the same time, taking up the slack in the other portion of the cord or rope in the direction indicated by the arrow *c*, the locking dog engaging and holding the cord fixedly against relaxation at the tightest pinching position.

Referring to the device A, as illustrated in Figs. 1 to 4 inclusive, utilizing the single holding dog, it consists of a partially hollow casing or base, which may be in any suitable form, and is preferably cylindrical as shown. At one side of its center, the casing is provided with an open socket 4 within a partially surrounding rim or edge portion 5, having an enlarged peripheral opening 6 and a reduced cord-holding opening 7, through which the end of the cord is inserted from the exterior and knotted as indicated at 8, whereby to fixedly hold it against the withdrawal. Extending across the middle portion of the member A, is a rib or wall portion 9, one face of which, at the outer side is adapted to provide a bearing for the cord 2, as illustrated in Fig. 2, and against which face it is forcibly pressed by the locking dog 10. Said dog is pivotally mounted on a pin 11, extending through the body portion of the casing A, as indicated in Figs. 2 and 3, and is sufficiently close to its rim portion to so locate the dog that its peripheral knurled portion 12 will extend outwardly beyond the circular edge portion of the casing, to enable the user to actuate it by the thumb or finger in relasing. For such purpose the edge portion of the casing is provided with an opening 13, a similar opening 14 being provided beyond such opening for the terminal end of the dog to fit into in relaxed position, as indicated by the dotted line in Fig. 2.

Dog 10 is provided with a knurled, serrated or toothed gripping edge 15, preferably recessed crosswise of the dog, and grooved with relation to its pivotal center 11 in a direction generally eccentric to such center, in the form of a cam, i. e., with a constantly increasing radius. As thus constructed, when the locking dog is thrust into engagement with the cord 2, as indicated in Figs. 1 and 2, tension of the cord in the direction opposite to that indicated by the arrow $c$ will tend to draw the locking dog more tightly into engagement with it and will fixedly hold the cord in tight bearing engagement against rib 9, during maintenance of the strain.

The dog may be easily released by exerting pulling action on the casing and releasing it by rotation of the knurled extending rim portion 12, as will be readily understood.

In Fig. 6, I show a construction which is generally similar to that above described except that I employ a plurality of dogs $10^a$, $10^a$, pivotally mounted at $11^a$ at the opposite side portion of the casing A' and adapted to thrust each cord $2^a$ against the central rib $9^a$. The several other parts are the same and correspondingly marked with the exponent $a$ as shown at the side of Fig. 2. In such construction, each dog operates to hold the cord against movement in either opposite direction, thereby rendering the device capable of being used to tighten either strand of the cord, or both together, with relation to the article or articles being operated upon. Each dog, of course has the same individual and releasing function as provided for and described above.

In Figs. 4 and 5, I illustrate an additional feature of convenience and advantage in attaching to the obverse side of the device an identifying member or initial 16, secured by a screw 17, the initial fitting within the circular projecting ring 18 on the face of the device. By this means each lock may, if desired, have an ownership mark which contributes to its novelty and individuality.

In Fig. 7, the casing A″ as shown, is provided with one or more laterally extending lugs or ears 19, having a screw or bolt hole 20, by means of which the device may be fixedly secured in position against a wall, post, etc., and thus held stationary for use where the cord is capable of being used at a fixed location.

Further or other uses and modifications of the device in detailed construction or otherwise will suggest themselves to the skilled mechanic, and the invention may be changed or modified in details or design, within the scope of the appended claims.

What I claim is:—

1. A locking device of the character disclosed, comprising a holding base having at its middle portion a bearing abutment and a transverse opening at each side thereof, one of said openings being provided with a knot-retaining socket, and the other having a locking dog pivoted at its outer portion having a serrated curved locking face operable toward said bearing abutment.

2. A locking device of the character disclosed, comprising a holding base having at its middle portion a bearing abutment and a transverse opening at each side thereof, one of said openings being provided with a knot-retaining socket, and the other having a locking dog pivoted at its outer portion having a serrated curved locking face operable toward said bearing abutment and provided with a knurled hub extending beyond its edge of the holding base.

In testimony whereof I hereunto affix my signature.

WILLIAM A. RICHARDSON.